Figure 1:
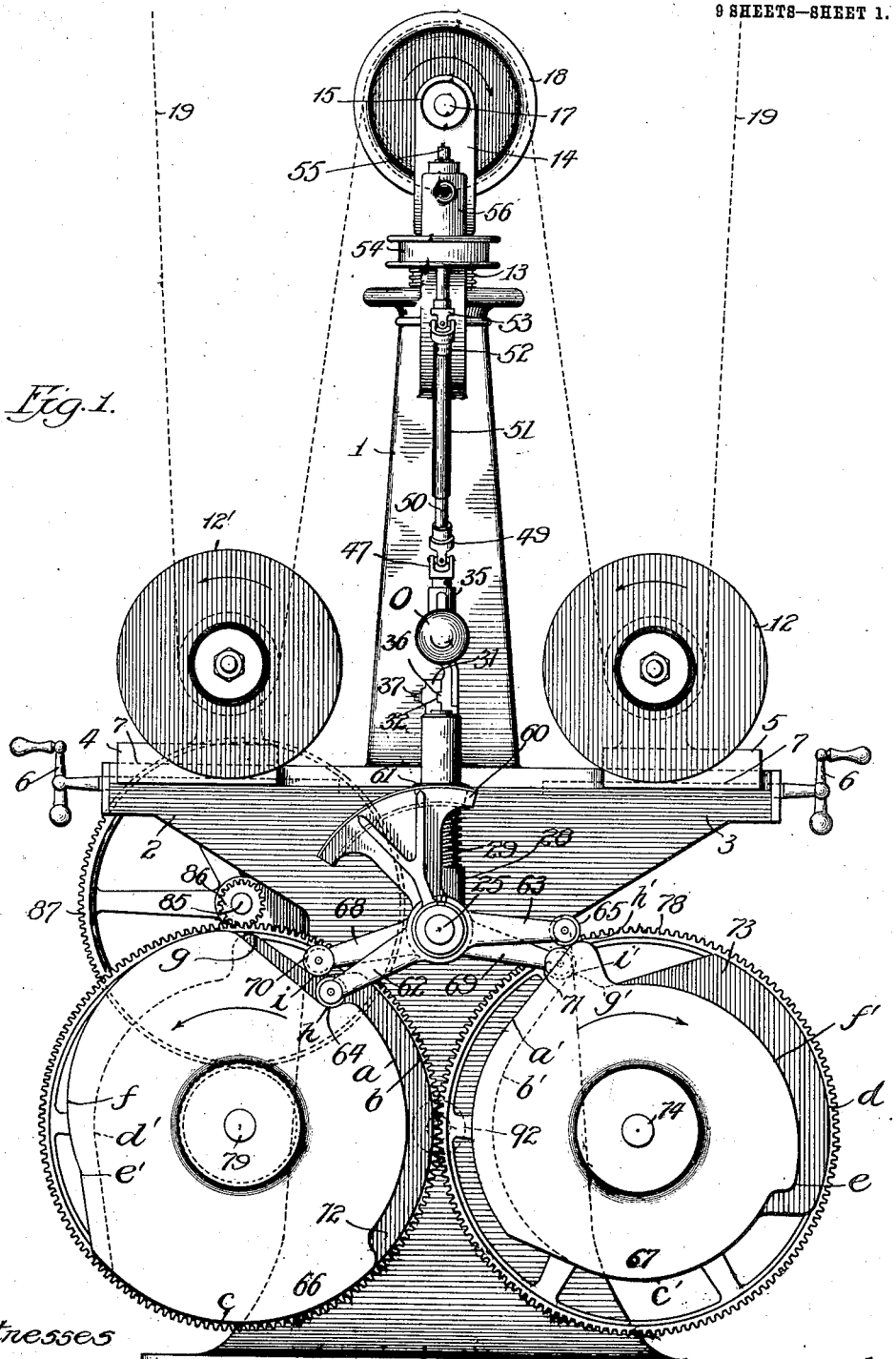

J. F. GAIL.
BUFFING MACHINERY.
APPLICATION FILED AUG. 2, 1909.

957,201.

Patented May 10, 1910.
9 SHEETS—SHEET 1.

Witnesses
Geo. E. Davison
Charles J. Schmidt

Inventor
John F. Gail
By Offield, Towle, Graves & Offield
Attys

J. F. GAIL.
BUFFING MACHINERY.
APPLICATION FILED AUG. 2, 1909.

957,201.

Patented May 10, 1910.

9 SHEETS—SHEET 2.

Witnesses
Geo. C. Davison
Charles J. Schmidt

Inventor:
John F. Gail
By Offield, Towle, Graves & Offield
Attys.

J. F. GAIL.
BUFFING MACHINERY.
APPLICATION FILED AUG. 2, 1909.
957,201.
Patented May 10, 1910.
9 SHEETS—SHEET 5.
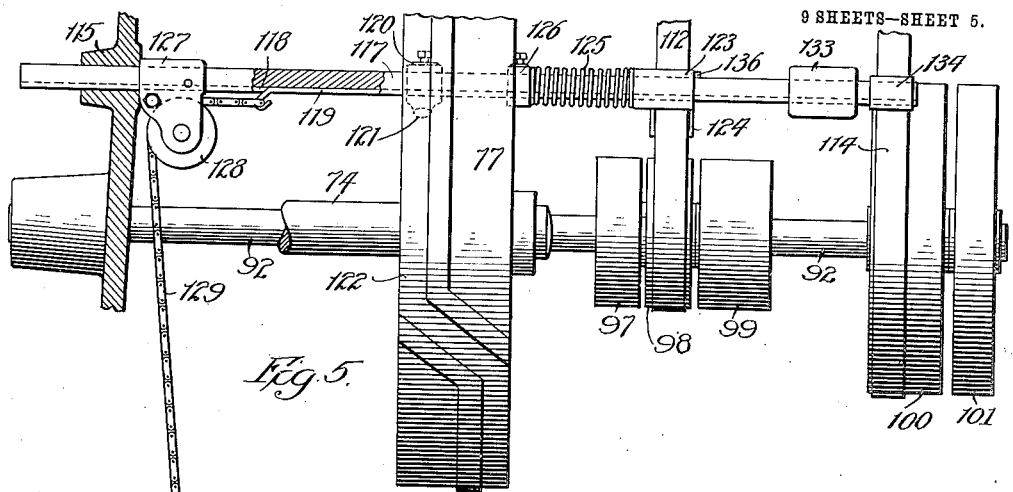
Fig. 5.
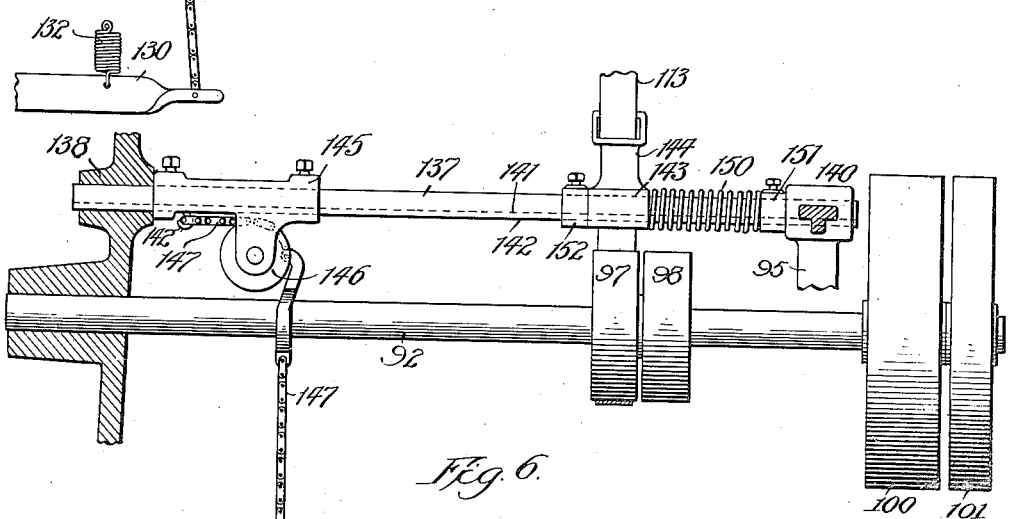
Fig. 6.
Witnesses:
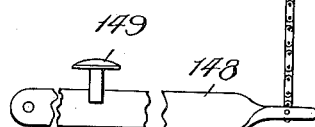
Inventor:
John F. Gail
By Offield, Towle, Graves & Offield
Atty's.

J. F. GAIL.
BUFFING MACHINERY.
APPLICATION FILED AUG. 2, 1909.
957,201.
Patented May 10, 1910.
9 SHEETS—SHEET 6.
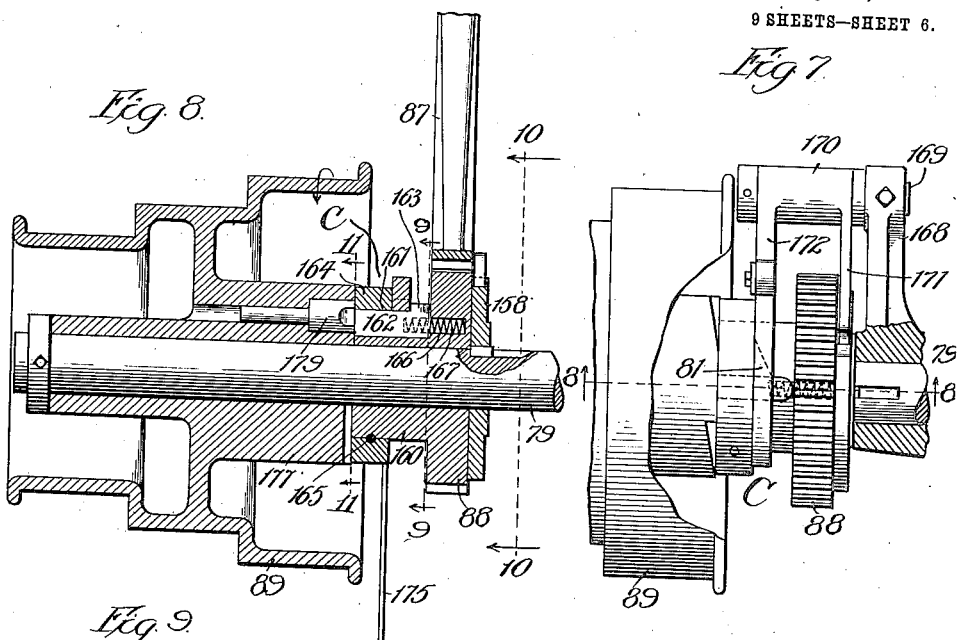
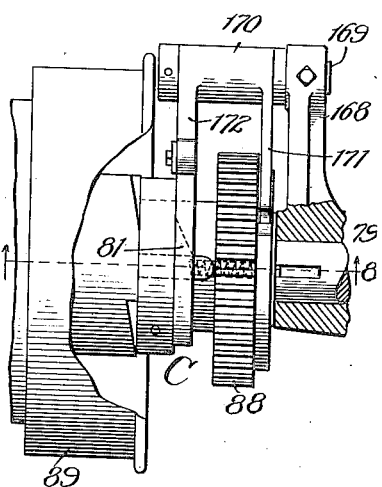
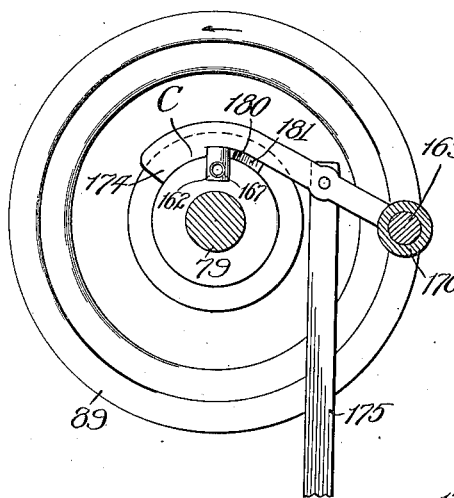
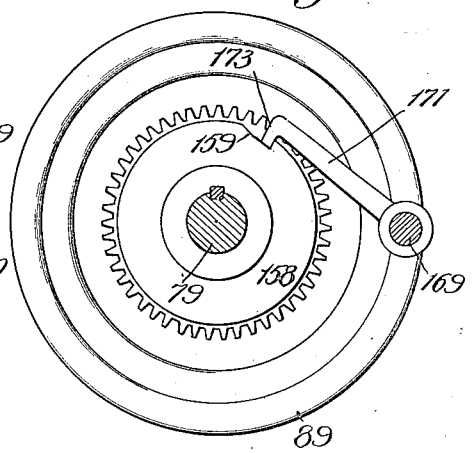
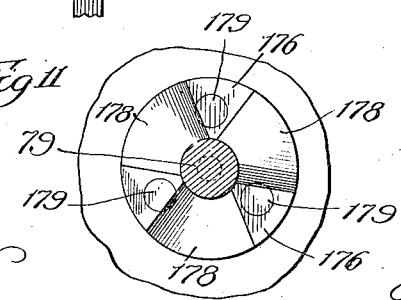
Witnesses:
Inventor:
John F. Gail
By Offield, Towle, Graves & Offield
Attys.

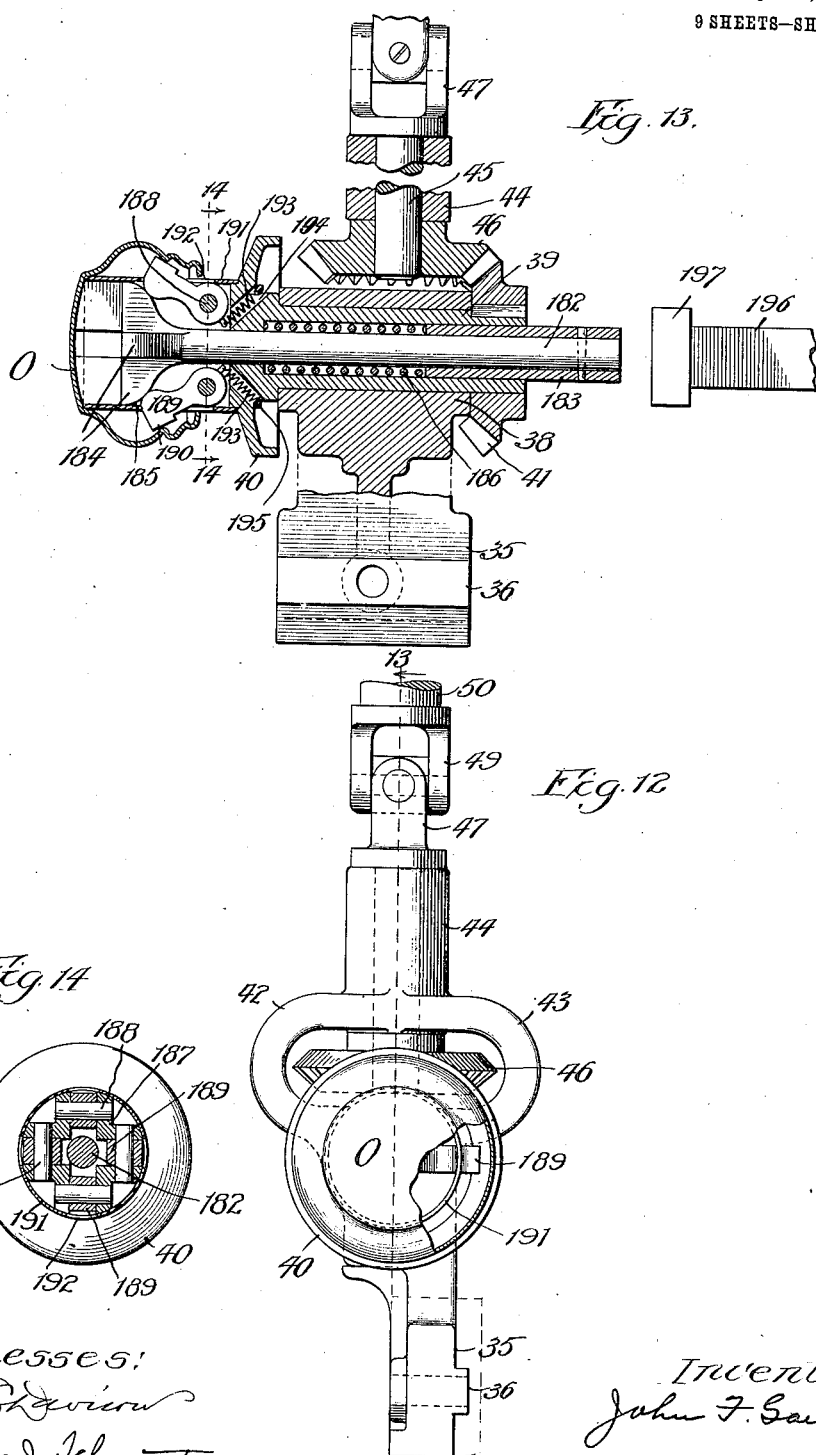

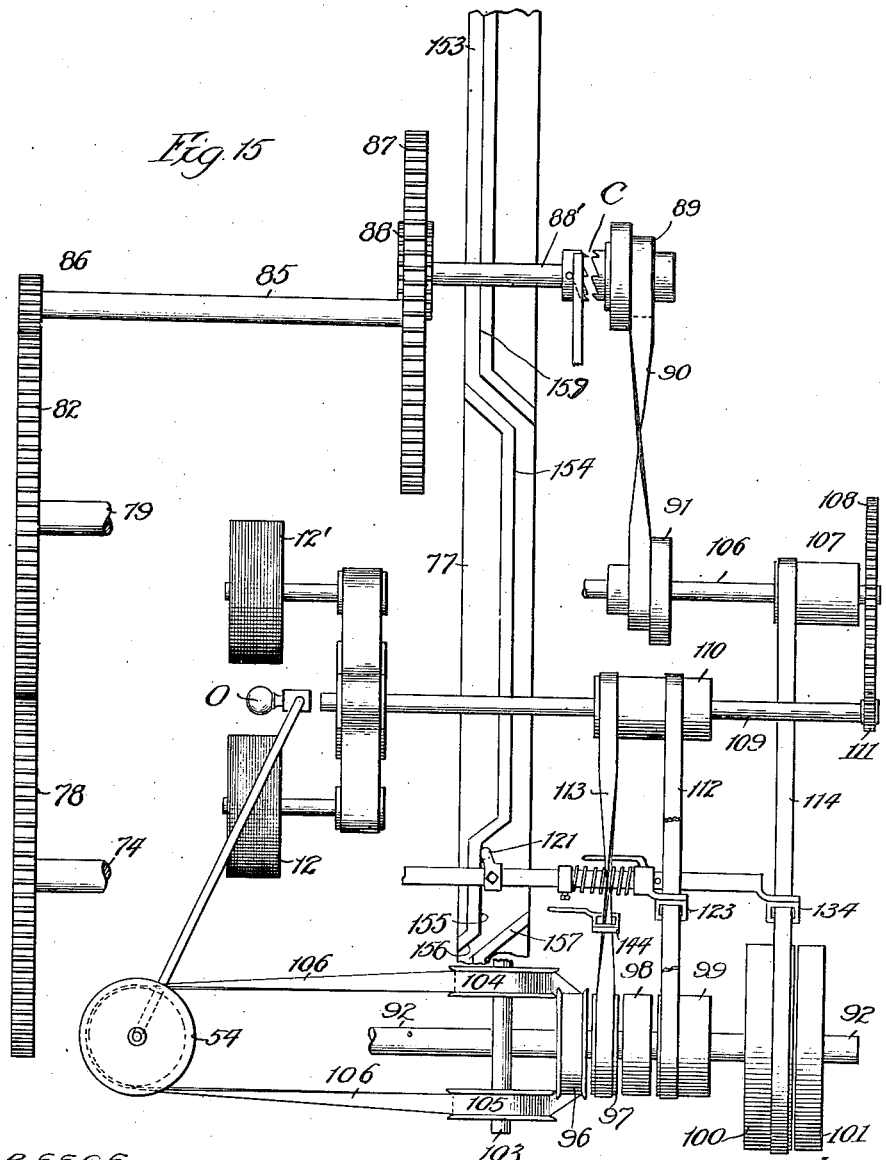

J. F. GAIL.
BUFFING MACHINERY.
APPLICATION FILED AUG. 2, 1909.
957,201.
Patented May 10, 1910.
9 SHEETS—SHEET 9.
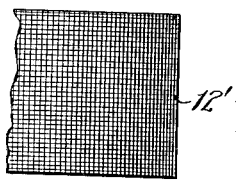
Fig. 16
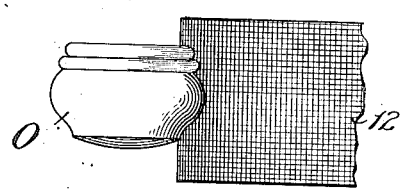
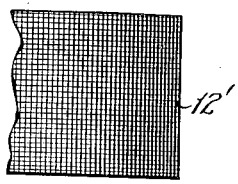
Fig. 17
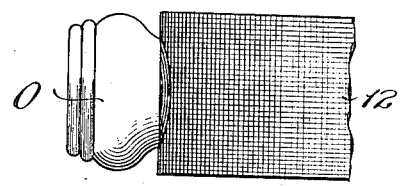
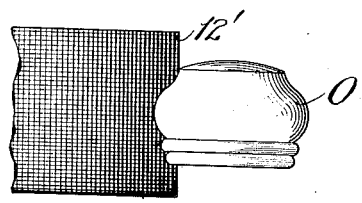
Fig. 18
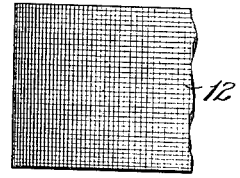
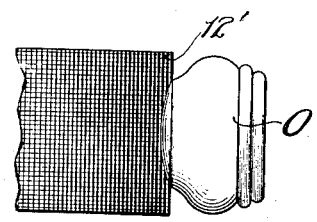
Fig. 19
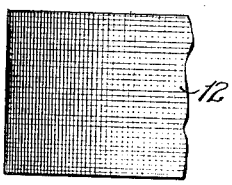
Witnesses:
Geo. C. Davies
Charles J. Schmidt
Inventor
John F. Gail
By Offield, Towle, Graves & Offield
Attys.

UNITED STATES PATENT OFFICE.

JOHN F. GAIL, OF KENOSHA, WISCONSIN, ASSIGNOR TO THE SIMMONS MANUFACTURING COMPANY, OF KENOSHA, WISCONSIN, A CORPORATION OF WISCONSIN.

BUFFING MACHINERY.

957,201.   Specification of Letters Patent.   Patented May 10, 1910.

Application filed August 2, 1909. Serial No. 510,761.

*To all whom it may concern:*

Be it known that I, JOHN F. GAIL, residing at Kenosha, in the county of Kenosha and State of Wisconsin, have invented certain new and useful Improvements in Buffing Machinery, of which the following is a complete, clear, full, and precise specification.

My invention relates to buffing machinery. In my Patent No. 927,036, issued July 6, 1909, I have shown a machine adapted particularly for buffing and polishing long objects such as tubes, but in my present invention the object is to produce a machine which will automatically buff and polish smaller parts such as mounts, knobs or the like.

In the machine of this application a coarser and finer buffing wheel are employed, and one of the main features of the invention lies in the entirely automatic control of the object carrier to carry the object first to be treated by the coarser wheel and then to be treated by the finer wheel. The object is applied to the carrier, the machine started and all the operations of buffing and polishing will be carried out automatically and the machine stopped when the operation is complete.

Another feature of my invention resides in the automatic changing from slow to higher speed of rotation of the object as it is carried from the coarser to the finer wheel and in the changing of direction of rotation during such transit. When the object is in association with the coarser wheel it is given a slow rotation so that all dirt, spots and unevenness are first removed whereupon the object is transferred into the field of the finer wheel, and during such transfer, the speed of rotation of the object is automatically increased so that a high polish and finish will be given the object by the finer wheel.

Another feature of my invention is the improved cam mechanism for controlling various movements of the object carrier to carry and to hold the object in proper association with the buffing wheels. The carrier frame is mounted to rotate and to swing, the cam mechanism causing combinations of such rotational and swinging movement so that the various surfaces of the object are applied in proper sequence to the buffing wheels. Different cams may be substituted for building up the cam mechanism to control the proper movement of the carrier for differently shaped objects.

Figure 2:
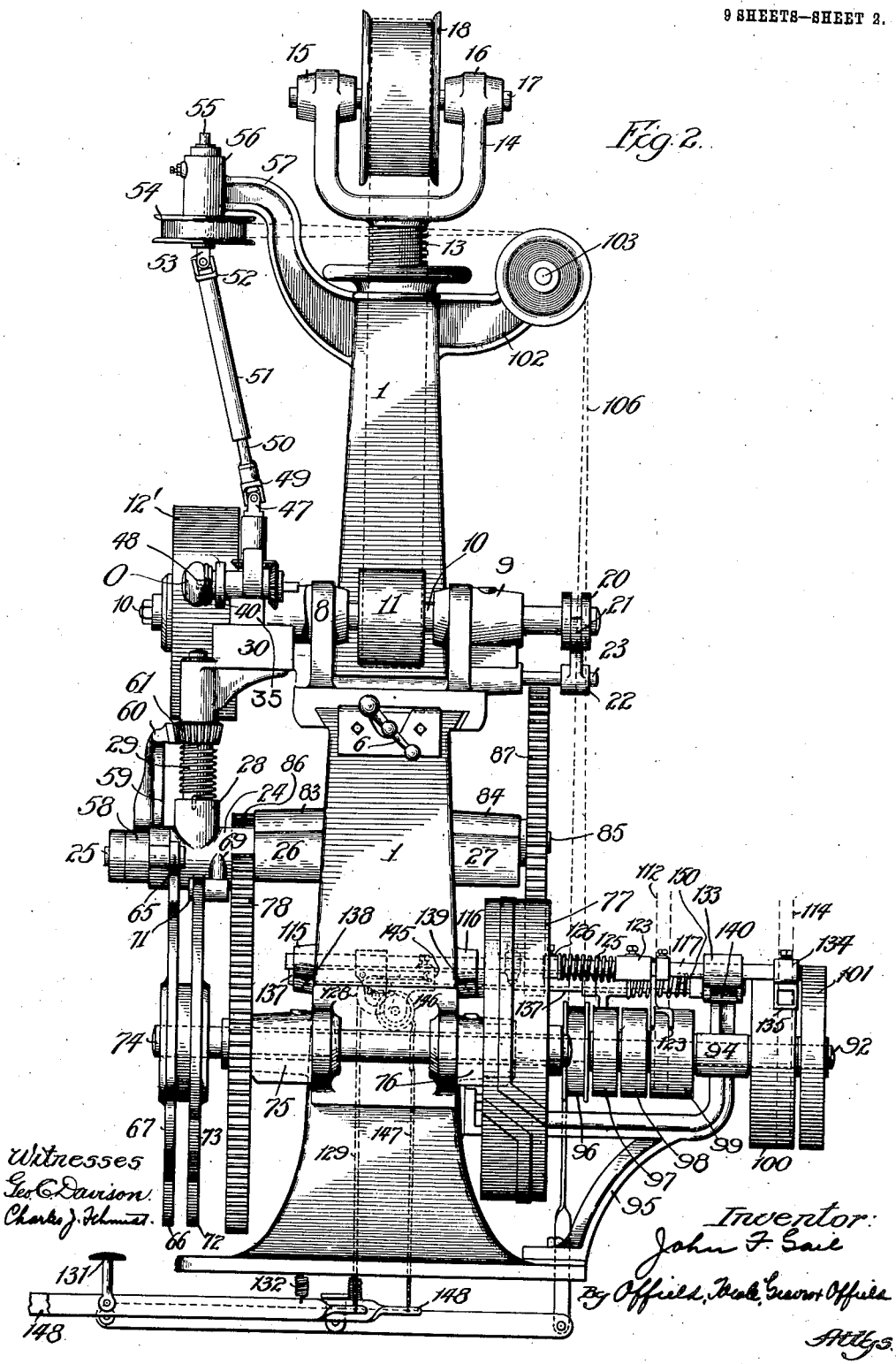
Figure 3:
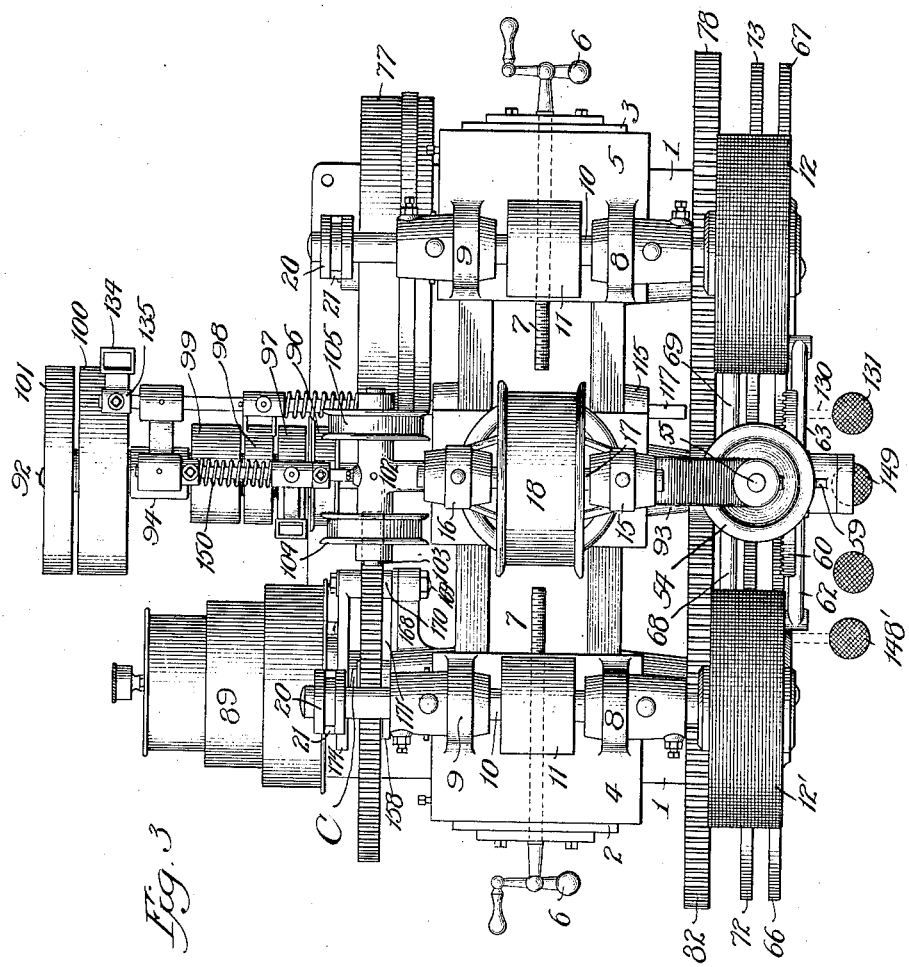
Figure 4:
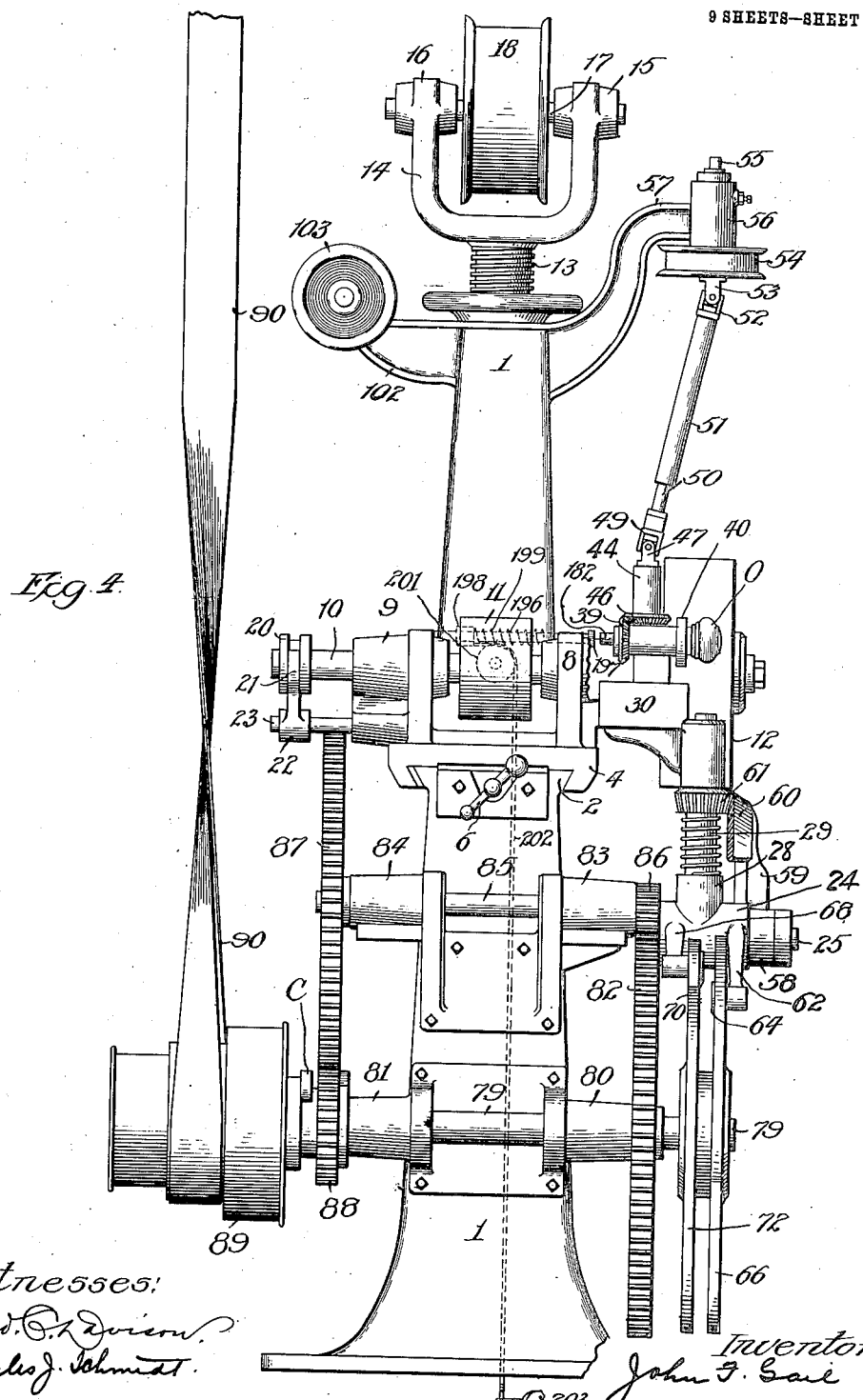

The various features above pointed out and also other features of construction and arrangement are fully illustrated in the accompanying drawings in which:

Figure 1 is a front elevation view of the machine embodying the various features. Fig. 2 is a side elevation looking from the right. Fig. 3 is a plan view. Fig. 4 is a side elevation taken from the left of Fig. 1. Fig. 5 is an enlarged side elevation of one belt shifting mechanism. Fig. 6 is an enlarged side elevation of another belt shifting mechanism. Fig. 7 is an enlarged side plan view of the clutch mechanism. Fig. 8 is a sectional view on plane 8—8 of Fig. 7. Fig. 9 is a sectional view from plane 9—9, Fig. 8. Fig. 10 is a sectional view from plane 10—10, Fig. 8. Fig. 11 is a sectional view from plane 11—11, Fig. 8. Fig. 12 is a front view of the object carrier showing clamp mechanism for holding the object to the carrier. Fig. 13 is a sectional view on plane 13—13, Fig. 12. Fig. 14 is a sectional view taken on plane 14—14, Fig. 13. Fig. 15 is a diagrammatic lay-out of the various driving parts of the machine to more clearly show their coöperation. Fig. 16 diagrammatically shows the ends of the coarser and finer buffing wheel with the object in engagement with the coarser wheel to have its side surfaces buffed. Fig. 17 is a similar view but showing the object as having been turned ninety degrees to bring its front face into contact with the coarser wheel, Fig. 18 is a similar view showing the object after having been carried into the finer buffing wheel to engage its side surfaces therewith, and Fig. 19 is a similar view showing the position of the object after having turned to bring its front face into engagement with the finer buffing wheel.

The machine supporting frame comprises a standard 1 having at an intermediate part dovetailed lateral extensions 2 and 3 for supporting carriages 4 and 5, dovetailed to fit and to slide on the extensions 2 and 3. Adjustment of the carriages 4 and 5 on the extensions or shelves 2 and 3 may be controlled in the ordinary manner by means of cranks 6 at the ends of threaded rods 7 which are journaled on the shelves and which have suitable threaded engagement with the carriages. Each rod supports bearings 8 and 9 in which is journaled a shaft 10 carrying between the bearings a driving pulley 11. The right shaft 10 carries at its front end a comparatively coarse buffing wheel 12, while the left shaft 10 carries a finer buffing wheel 12'. Extending from and threaded into the upper end of the standard 1 is a post 13 carrying a U frame 14 whose ends terminate in bearings 15 and 16 which journal a shaft 17 carrying a pulley 18. As best shown in Fig. 1, the driving belt 19 for the buffing wheels passes about the driving pulley of the buffing wheel 12 then over the pulley 18 and then about the driving pulley of buffing wheel 12'. By means of the threaded engagement of the bearing frame 14 with the standard 1, the tension of the belt 19 on the various pulleys can be adjusted. The driving shaft 10 of each buffing wheel carries at its rear end a grooved collar 20 which is engaged by a fork 21 extending upwardly from a sleeve 22 adjustably secured to a stud shaft 23 extending rearwardly from the corresponding buffing wheel carriage. Each buffing wheel can therefore be adjusted longitudinally and willl then be maintained in its adjusted plane of rotation by the fork arm.

The carrier frame is supported from a hub 24 pivoted to a shaft 25 journaled in bearing lugs 26 and 27 extending from the standard 1, the shaft 25 being parallel to the driving shafts of the buffing wheel. The hub 24 has an upwardly extending bearing sleeve 28 which journals the lower end of an arm 29 from whose upper end extends a supporting shelf 30 carrying a vertical wall 31 having a horizontal slot 32 cut in its inner face. On this supporting shelf 30 the carrier frame 35 is supported, the frame having a tongue 36 for engaging and sliding in the slot 32, a screw 37 serving to hold the parts in adjusted position. The carrier 35 near its middle is expanded to form a transverse bearing sleeve 38 for journaling a holder 39 carrying at its front end a face plate 40 and at its rear end a beveled gear 41. Curved arms 42 and 43 extend upwardly from opposite sides of the sleeve 38 and terminate in a bearing sleeve 44 which journals a shaft 45 terminating at its lower end in a bevel gear 46, which meshes with gear 41, and terminating at its upper end in a coupling head 47. With this arrangement rotation of the coupling head in a horizontal plane will result in rotation of the face plate 40 in a vertical plane. Mounts, knobs or like parts of bedsteads sometimes have burs 48' by means of which they are fastened to the bedstead frame, and for such objects a threaded stud 48 extends centrally from the face plate 40 for receiving the burs and for thus supporting the object from the face plate. The coupling head 47 has pivotal engagement with a coupling head 49 at the lower end of a rod 50 which telescopes into a sleeve 51 having at its upper end a coupling head 52 which pivotally engages a coupling head 53 carried with a driving pulley 54 on shaft 55 carried in the vertical bearing sleeve 56 at the end of a bracket 57 extending forwardly from the upper end of standard 1.

Journaled on the shaft 25 in front of the hub 24 is a hub 58 from which extends an arm 59 carrying at its end a segmental gear 60 which meshes with a pinion 61 secured on arm 29 so that oscillation of the arm 59 will cause rotational movement of the arm 29 and of the supporting shelf 30 with the carrier frame supported thereby. The hub 58 has also two lateral arms 62 and 63 terminating in cam rollers 64 and 65 which coöperate with cams 66 and 67, respectively. The hub 24 has lateral arms 68 and 69 pivoting cam rollers 70 and 71 which coöperate with cams 72 and 73, respectively. The cams 66 and 67 control the rotational movement of the carrier frame supporting arm 29 while the cams 72 and 73 control swinging of this arm about the shaft 25. These cams, therefore, coöperate to produce combined rotational and swinging movement of the carrier frame and object supported thereby, and the coupling heads 47, 49 and 52, 53 form universal couplings so that rotation of the pulley 54 will result in rotation of the face plate and object thereon during any position of the carrier frame.

Cams 67 and 73 are mounted side by side at the front end of a shaft 74 journaled in bearing lugs 75 and 76 extending from the left side of the standard 1, the inner end of said shaft carrying a cylindrical cam 77. Between the bearing lug 75 and the cams at the front of the shaft 74, this shaft carries a gear 78. Cams 66 and 72 are carried at the front end of a shaft 79 which is journaled in bearing lugs 80 and 81 extending from the left of the standard 1. This shaft to the rear of the cams at the front thereof also carries a gear 82 which meshes with gear 78, as best shown in Fig. 1. Above the bearing lugs 80 and 81 are bearing lugs 83 and 84 for journaling a shaft 85 carrying at its front end a pinion 86 and at its rear end a gear 87. The pinion 86 meshes with the gear 82 while the gear 87 meshes with a pinion 88 loosely mounted on shaft 79. The rear end of shaft 79 also loosely carries a cone pulley 89 which is adapted for connection with pinion 88 through clutch mechanism C. The pulley 89 is connected through belt 90 with a suitable driving pulley 91 (Fig. 15), and when the clutch mechanism connects pulley 89 with the pinion 88 rotation is transmitted to gear 87, shaft 85, pinion 86, gears 82 and 87 and to cam shafts 74 and 79 to cause rotation of cams 66, 67 and 72, 73 and corresponding swinging and rotational movement of the carrier frame, this movement being such that the object supported on the carrier frame will be carried first into engagement with one buffing wheel and then into engagement with the other buffing wheel, as will be shown more fully later.

Extending from front to rear midway between the shafts 74 and 79 is a shaft 92 journaled at its front part in bearings 93 extending from the standard 1 and at its rear end journaled in a bearing 94 at the end of a bracket 95 extending from the standard 1. Mounted on this shaft between the bearing 94 and the standard are pulleys 96 and 97, 98 and 99, pulleys 96 and 98 being secured to the shaft, and pulleys 97 and 99 being loose thereon, the pulley 99 being also wider than the other pulleys. At the rear end of the shaft is a wide pulley 100 loosely mounted and a driving pulley 101 secured to the shaft. Extending rearwardly from the top of the standard is a bracket 102 journaling in a shaft 103 whose ends carry pulleys 104 and 105, and over these pulleys passes a belt 106 which also passes about the pulley 54 and the drive pulley 96.

Referring to Fig. 15 pulley 91, which has already been referred to, is mounted on counter-shaft 106' carrying also a wide pulley 107 and a gear 108. A second counter-shaft 109 is adapted for connection with a driving motor or engine and carries a wide pulley 110 and a pinion 111 which pinion meshes with gear 108. Straight and crossed belts 112 and 113 engage about pulley 110, belt 112 being adapted for connection with pulleys 98 and 99 and belt 113 being adapted for engagement with pulleys 98 and 97. A belt 114 engages pulley 107 and is adapted for connection with pulleys 100 and 101. The shifting mechanism for belts 112, 113 and 114 is shown in Figs. 5 and 6. Slidable through bearing lugs 115 and 116 on the standard above the shaft 92 is a bar 117 having a slot 118 in which may slide a rod 119. Secured to the bar 117 is a block 120 whose end 121 engages in a cam slot 122 formed on cam 77. Secured to the rear end of rod 119 is a sleeve 123 having sliding engagement on bar 117 and having a guide arm 124 for receiving belt 112. A spring 125 encircles bar 117 and abuts against sleeve 123 and against a collar 126 secured to the bar 117 so that the spring will resist movement of the sleeve 123 toward the left. Secured also to the front end of the bar 117 is a frame 127 pivoting a pulley 128 over which passes a chain 129 whose upper end is secured to the front end of rod 119 and whose lower end engages the rear end of a treadle 130 pivoted at its front end, and at an intermediate point supporting a foot plate 131. A spring 132 tending to resist downward movement of said treadle. Pressure on foot plate 131 will cause the rear end of said treadle to move downwardly to cause the bar 119 with its belt shifting sleeve 123 to be drawn forwardly. The rear end of bar 117 passes through bearing lug 133 supported from the bracket 95 and at its rear end carries a sleeve 134 supporting a belt shifting arm 135 for receiving belt 114. A pin 136 extends from bar 117 and against this pin sleeve 123 is pressed by spring 125 when treadle 130 is up. When treadle 130 is moved downwardly the sleeve 123 is moved away from the pin and only belt 112 will be shifted. However, when the end 121 is moved to the left by the cam 77, bar 117 will be drawn to the left to shift belt 114 and at the same time pin 136 will carry sleeve 123 to the left to shift belt 112.

Below bar 117 is a second bar 137 adapted to slide in bearings 138 and 139 on the standard and in bearing 140 supported from bracket 95. This bar has a slot 141 in which slides a rod 142 carrying at its rear end a sleeve 143 carrying a belt shifting arm 144 engaging belt 113. Secured to the front end of the bar 137 is a frame 145 pivoting a pulley 146 over which passes a chain 147 connecting at its upper end with the rod 142 and at its lower end with the rear end of treadle 148, which treadle is pivoted at its front and at an intermediate point bears a foot plate 149. Pressure on this treadle causes the rod 142 and its belt shifting sleeve 144 to be carried rearwardly, this rearward movement being resisted by a spring 150 engaging between sleeve 143 and a collar 151, the forward movement of the sleeve being limited by a collar 152.

In Fig. 15 the cam 77 is shown developed. This cam has the front and rear cam-ways 153 and 154 and intermediary way 155 formed by bars 156 and 157. Before the machine starts the end 121 engages in intermediary cam way 155, and immediately upon rotation of the cam will be carried to the rear cam-way 154 as shown in Fig. 15. As before stated cams 66, 67 and 72, 73 control the movements of the object carrier so that the object is properly engaged with the buffing wheels and the shape of the cams depend upon the shape of the object. In the figures the object is of more or less ellipsoidal shape and the cams are of the shape shown to first associate the object with buffing wheel 12 and then to carry it over and into engagement with the buffing wheel 12'. When the segmental gear 60 and the arm 29 are to be swung to the right the cams 66 and 72 act positively on cam rollers 64 and 70 and cams 67 and 73 act merely as followers against cam rollers 66 and 67. If the segmental gear and arm are to be swung to the left cams 67 and 73 act positively on cam rollers 71 and 75 and cams 66 and 72 act as followers for rollers 64 and 70. The segmental gear and arm 29 are, therefore, locked against movement by the cams unless positively actuated by said cams.

The operation of the mechanism thus far described is as follows:

Referring to Fig. 15, clutch C is open to disconnect pulley 89 from pinion 88, this being the position before the machine is started. Belt 113 engages loose pulley 97, belt 112 engages the front end of loose pulley 99 and belt 114 engages at the rear end of loose pulley 100.

Referring to Fig. 1 the normal position of the carrier frame and the operation controlling parts is shown. The face plate 40 faces the front and the carrier frame supporting arm 29 stands vertical. To apply to the face plate an object O carrying a bur, the object is held with its bur against the end of threaded stud 48 and foot plate 149 depressed to carry down treadle 148 and to move belt shifting sleeve 144 rearwardly to carry belt 113 from pulley 97 to pulley 98. This causes transmission of rotation from the motor driven pulley 110 to the tight pulley 98 and to pulley 96 which is engaged by belt 106, and pulley 54 and pinion 46 will be driven in a counter-clockwise direction which results in counter-clockwise rotation of pinion 39 and the face plate 40 (looking from the front of the machine) and the bur of the object will, therefore, be carried along the threaded stud 48 and against the face plate. After the object is thus applied treadle 148 is released and belt 113 will be shifted back to loose pulley 97 by the force of spring 150. The operator depresses treadle 148 to bring into operation clutch C as will be shown more in detail later. This causes transmission from motor shaft 109 to pinion 111, gear 108, shaft 106, pulley 91 and pulley 89, the pinion 88 transmitting to gear 87, shaft 85, pinion 86 and to gears 78 and 82, gear 78 transmitting through shaft 74 to the cam 77. The various cams immediately start to rotate. The cam 77 carries the cam end 121 toward the rear from intermediary cam-way 155 to the rear cam-way 154 thus causing movement of both belt shifting frames 123 and 134 to carry belt 112 to the rear end of pulley 99 and to carry belt 114 into engagement with tight pulley 101 whereupon shaft 92 will be driven at slow speed from the motor shaft 109 through the speed reducing gears 111 and 108 and the object carrier face plate will be rotated at slow speed. Immediately upon connection of clutch C cams 66 and 72 will rotate in counter-clockwise direction and cams 67 and 73 will rotate in clockwise direction. Cam rollers 64 and 70 will be carried, respectively, from their normal position shown, to the cam surfaces a and b. The resultant upward movement of arm 62 will cause the segmental gear 60 to be swung to the right which will have a tendency to rotate arm 29 in a counter-clockwise direction (looking from the top). The resulting upward movement of arm 68 will cause arm 29 to be swung toward the right, and if the segmental gear were stationary, this swinging movement of the arm would result in clockwise axial rotation of the arm as the pinion 61 rolls across the segmental gear. However, as the segmental gear and arm 29 are swung together toward the right there will be no relative movement between the segmental gear and pinion 61 and the result of all these movements will be to swing the arm 28 to the right to carry the object into engagement with buffing wheel 12, as shown in Fig. 16. As the cams continue their rotation, roller 64 will be carried to the cam surface c roller 70 remaining on surface b, and the angular position of the arm 29 will, therefore, remain, but arm 62 will be raised to swing segmental gear 60 farther to the right to cause rotation of pinion 61 and of the object carrier to carry the object in a counter-clockwise direction into the position shown in Fig. 17.

In the position shown in Fig. 16 the side faces of the object are buffed and in the position shown in Fig. 17 the front faces are buffed. During the position shown in Fig. 17 the cam end 121 still remains in the slow speed cam-way 154. Cam roller 71 will next be moved positively by cam 73 to be carried to cam surface d, but for a time after such engagement, cam roller 64 still remains on cam surface c whereupon cam roller 65 is positively engaged by cam 67 and carried to cam surface e. During the time that cam roller 64 still remains on surface c arm 69 will be swung upwardly and arm 29 swung toward the left about half way, during which time the pinion 61 rolled over the stationary segmental gear 60 to cause counter-clockwise rotation of the carrier frame. When both arms 69 and 63 now move together upwardly the segmental gear and arm 29 are swung together toward the left without relative movement, the result of the entire step being to rotate the object carrier a distance and to swing it to the left to carry the object into engagement with the buffing wheel 12' and into the position as shown in the Fig. 18. While the object is being carried from one buffing wheel to the other the cam end 121 engages with cam bar 157 and is deflected to the left into the slow speed cam-way 153, this causing simultaneously shifting of belts 112 and 114, belt 112 being carried on to pulley 98 and belt 114 being carried to the front end of loose pulley 100. Pulley 98 is now driven directly from pulley 110 on the motor shaft 109 and the object is now driven at a higher speed of rotation. Its direction of rotation will also be reversed and it will now rotate in clock-wise direction. Cam roller 71 remains on cam surface *d*, but cam roller 64 is positively engaged by cam 66 and travels over cam surface *f* to gradually swing the arm 62 upwardly to carry segmental gear 60 to the right and to rotate carrier to bring the object into the position shown in Fig. 19, the object in this position having its front face polished, and in the position shown in Fig. 18 having its side faces polished. Cam roller 70 is now positively engaged by cam 72 and carried to cam surface *g* which will tend to swing the carrier frame arm over the right, but immediately afterward cam 65 is positively carried back to its normal position by cam 67 and then both cam rollers 64 and 70 are brought to their normal position *h* and *i*. The result of this last combination of movements is to bring the carrier and object back to their normal positions, as shown in Figs. 1, 2 and 3. While the object is being carried away from buffer 12' and to its normal position cam end 121 passes from high speed cam-way 153 to the intermediate cam-way 155 which results in shifting of belt shifting frames 123 and 134 rearwardly to carry the belt 112 back to the front end of pulley 99 and to carry belt 114 back to the rear end of pulley 100. When the cam end 121 reaches its normal position at the end of the intermediary cam-way 155, and when the object has been returned to its normal position, the clutch C will act to unclutch pulley 89 from gear 88 and to bring the cams to rest. The various follower surfaces which coöperate with the respective surfaces which positively actuate the cam arms are given corresponding reference characters, but which are primed.

One form of clutch mechanism which may be used advantageously for automatically un-clutching and for bringing the cams to rest is shown in Figs. 7 to 11 inclusive. As before stated the pinion 88 rotates with shaft 79. Also keyed to rotate with the shaft and mounted thereon adjacent the pinion 88 is a stop disk 158 having in its periphery a stop notch 159. The pinion 88 has a hub 160 extending therefrom which hub has a longitudinal channel 161 in which may reciprocate a clutch pin 162 having a radial cam extension 163 at its inner end. After insertion of the pin in the channel a collar 164 is secured by a pin 165 about the outer end of the hub to confine the pin to the channel, but to leave a space between the collar and the pinion which is wider than the cam extension 163. The pinion has a pocket 166 containing a spring 167 which abuts against the clutch pin tending to force it outwardly. As best shown in Fig. 7 the bearing 81 has a lateral extension 168 which extends outwardly over the pinion and which journals a hub 170 from whose inner end extends a stop arm 171 and from whose outer end extends a cam arm 172.

The stop frame terminates in a stop tooth 173 which coöperates with the stop notch 159 and engages in said notch when the machine is at rest. The cam arm 172 extends between the collar 164 and the pinion 88 and when the machine is at rest the front end 174 of the arm rests against the hub 160 between the collar and the cam extension 163 of the clutch pin to hold the clutch pin in its in position with its outer end flush with or within the outer face of the hub 160, this being best shown in Fig. 8. Pivoted to an intermediary point of the cam lever is a rod 175 whose lower end pivots to the inner end of treadle 148 already referred to, so that pressure of the front end of said lever will cause raising of the cam arm and withdrawal of the front end of the arm from the path of the cam extension 163. The outer end of the clutch pin coöperates with teeth 176 which extend from the hub 177 of the pulley 89. As shown in Fig. 11 there are three such teeth separated by inclines 178, each incline leading from the foot of one tooth gradually to the outer face of the next tooth. For better wearing efficiency wheel pins 179 extend through the teeth to give a good wearing surface at the sides of the teeth where they are engaged by the end of clutch pin 162. As best shown in Fig. 9 the front end 174 of the cam lever extends radially inwardly a distance beyond the body of the lever and this section 174 at its inner end is tapered across to form a lateral incline 180. The operation of the clutch mechanism will now be understood. When the machine is at rest the end of the cam lever beyond the incline is between the collar 164 and the clutch pin extension so that the clutch pin is held in out of the path of the clutch teeth 176. During the same time the tooth 173 of the stop arm is in the stop notch to lock the shaft 79 against rotation, thus locking the various controlling gears and the cylindrical cam against rotation. The pulley 89 is constantly driven, but will be free until the cam arm is raised by pressure of the treadle whereupon the spring 166 tends to force the clutch pin outwardly and a tooth 176 will eventually, if not immediately, engage the projecting end of the pin and the pinion 88 will then be carried with the pulley and the shaft 79 rotated to thus cause rotation of the gear 87 and of the various other gears controlled thereby, the stop arm having been raised with the cam arm so that the shaft 79 is unlocked. The shaft 79 makes a complete revolution, but just before the end of the revolution, the point 181 of the incline 180 will engage the clutch pin extension 163 and the extension will be carried along the incline so that the clutch pin is shifted inwardly to its normal position, at which time the stop notch 159 will again be in position to receive the stop tooth 173 whereupon the pulley again becomes free and the shaft 79 relocked. Each revolution of the shaft 79 will cause a complete revolution of the object mount-controlling cams and of the cylindrical cam for controlling the direction and speed of rotation of the object carrier. Thus at the end of each buffing operation the cam arm and stop arm become affected to automatically unclutch and to stop the object controlling parts.

In Figs. 1 and 2 the face plate of the object holder is shown as provided with a threaded stud 48 for receiving the bur 48' of the object. In Figs. 12, 13 and 14 is shown clamping mechanism for securing to the holder such objects which have no burs. The holder 39 is hollow and journals a rod 182 which at its inner end has pinned thereto a collar 183. The front end of the rod terminates in four radial arms 184 having the inner switch surfaces 185, a spring 186 encircling the rod between the front end of the holder and the collar 183, this spring tending to force the rod rearwardly. Extending from the face plate 40 are lugs 187 carrying pins 188 on which are pivoted clamping fingers 189 whose ends at their inner edge are engaged by the switch surface 185 so that the force of spring 186 will tend to swing and force the fingers radially outwardly to carry their ends 190 into clamping engagement with the inner face of object O which is slid over a sleeve 191 mounted on the face plate and which has the opening 192 through which the fingers may pass. From the hub of each finger a spring 193 extends through an opening 194 in the face plate and secured to a ring 195, these springs tending to rotate the arms into the sleeve 191. Outward pressure, therefore, against the rod 182 will move the wedge arms away from the fingers and will allow the springs 193 to move the fingers within the sleeve 191 to make way for the application of the object so that release of the rod 182 will again cause the fingers to be spread outwardly into clamping engagement with the applied object.

In Fig. 4 is shown the means for forcing the rod 182 outwardly. Extending through standard 1 in the plane of the rod 182 is a rod 196 having a head 197 at its front end for engaging the rod 182 and at its rear end having a collar 198 between which and the standard is interposed a spring 199 which reverses the forward movement of the rod 196. Within the standard and secured thereto below the rod 196 is a lug 200 pivoting a pulley 201 about which passes a chain 202 whose upper end connects with the rod 196 and whose lower end is connected to the treadle lever 203 pivoted at the base of the machine so that when its front end is depressed it will cause a downward pull of the chain and forward movement of the rod 196 to engage with and to force forwardly the rod 182. Thus to apply an object the treadle lever is depressed and the object slipped over the sleeve 191 to be clamped by the clamping fingers upon release of the treadle lever.

I thus produce a machine which is particularly adaptable for speedily and effectively buffing and polishing small curvilinear objects such as bedstead mounts, knobs or the like. The machine is entirely automatic in its operation by pressing one treadle an object can be applied and will automatically be locked to the holder. By pressing another treadle the machine is started and the object carried successively from one buffing wheel to the other and is shifted to bring its surfaces into proper association with the wheels. During transit of the object from the coarser wheel to the finishing wheel the direction of rotation of the object is automatically changed and its speed of rotation automatically increased so that it will receive a high polish during its association with the finishing wheel. After the object has been polished its rotation and movement are automatically stopped and the object brought back to its normal position in which the proper treadle can again be depressed, the object removed from the holder and another object applied.

I do not wish to be limited to the exact construction and arrangement or sequence of movement which I have described as changes and modifications can be made which would still come within the scope of my invention.

I claim the following.

1. In a machine of the class described, the combination of a buffing wheel, a carrier frame for supporting an object to be treated, automatic power driven mechanism for bodily moving said carrier frame and for axially rotating said carrier frame whereby the supported object is automatically positioned with reference to the buffing wheel, and means for rotating the object.

2. In a machine of the class described, the combination of a buffing wheel, a carrier frame for supporting an object to be treated, means for bodily moving said carrier frame, means for axially rotating said frame, said means being adapted to operate simultaneously to carry the supported object into various positions with reference to the buffing wheel and during treatment thereof.

3. In a machine of the class described, the combination of a buffing wheel, a carrier frame supporting an object to be buffed, means for bodily swinging said carrier frame to engage the supported object with the buffing wheel, and means for axially rotating said carrier to change the positions of the object with reference to the buffing wheel when engaged thereby, said means being adapted to operate simultaneously.

4. In a machine of the class described, the combination of a buffing wheel, a carrier frame supporting an object to be buffed, means for bodily swinging said carrier to engage the supported object with the buffing wheel, means for axially rotating said carrier to change the positions of the object with reference to the buffing wheel when engaged thereby, and means for axially rotating the object during its application to the buffing wheel.

5. In a machine of the class described, the combination of a buffing wheel, a carrier frame for supporting an object to be buffed, means for bodily moving said carrier to bring the object into engagement with the buffing wheel, means for axially rotating said carrier, said bodily moving means and said axially rotating means being adapted to operate simultaneously to shift the positions of the object during application thereof to the buffing wheel, and means for rotating the object independently of the carrier movement.

6. In a machine of the class described, the combination of a buffing wheel, a carrier frame, a rotatable holder on said carrier for supporting an object to be buffed, means for rotating said holder and thereby the object, means for bodily moving the carrier to bring the object into engagement with the buffing wheel, and means for axially rotating said carrier to swing the object into various positions during application thereof to the buffing wheel.

7. In a machine of the class described, the combination of a buffing wheel, a carrier frame pivoted at one end and adapted at its other end for supporting an object to be buffed, and cam mechanisms for causing simultaneous swinging movement of the carrier and rotation thereof on a longitudinal axis.

8. In a machine of the class described, the combination of a carrier frame for supporting objects to be buffed, said carrier frame being adapted to move bodily and to rotate axially, cam mechanism for controlling the bodily movement of the carrier to carry an object thereon into association with the buffing wheel, and cam mechanism for controlling rotation of said frame to move the object when in association with the buffing wheel.

9. In a machine of the class described, the combination of a buffing wheel, a pivoted frame, means for swinging said frame about its pivot, means for axially rotating said frame, a holder journaled in said frame for supporting an object to be buffed, and means for rotating said holder.

10. In a machine of the class described, the combination of a buffing wheel, a pivoted supporting frame, means for swinging said frame about its pivot, an arm extending from and journaled in said frame, means for causing axial rotation of said arm, a holder journaled on said arm for supporting an object to be buffed, and means for rotating said holder.

11. In a machine of the class described, the combination of a buffing wheel, a pivoted supporting frame, cam mechanism associated with said frame to swing said frame about its pivot, an arm extending from and journaled in said frame, a pinion on said arm, a gear frame for coöperating with said pinion to cause axial rotation of said arm, and cam mechanism for controlling said gear frame, said arm being adapted for supporting an object to be buffed, said cam mechanisms coöperating to control the position of the object with reference to said buffing wheel.

12. In a machine of the class described, the combination of a buffing wheel, a pivoted supporting frame, cam mechanism associated with said frame to swing said frame about its pivot, an arm extending from and journaled in said frame, a pinion on said arm, a gear frame for coöperating with said pinion to cause axial rotation of said arm, cam mechanism for controlling said gear frame, a holder journaled on said arm for supporting an object to be buffed, and means for rotating said holder.

13. In a machine of the class described, the combination of a plurality of buffing wheels, supporting means for objects to be buffed, mechanism coöperating to effect bodily movement of the supporting means to carry an object thereon from one wheel to another and to vary the position of the object during application thereof to a wheel.

14. In a machine of the class described, the combination of a plurality of buffing wheels, a supporting frame for an object to be buffed, means for swinging said frame to carry an object thereon from one buffing wheel to another, and means for rotating the frame to vary the position of the object during application thereof to a wheel.

15. In a machine of the class described, the combination of a plurality of buffing wheels, a supporting frame, a holder journaled on said frame for supporting objects to be buffed, means for bodily moving said frame to carry an object from one buffing wheel to another, means for rotating said holder, and means for automatically changing the speed of rotation of said holder to cause the object to rotate faster when applied to one wheel than when applied to another.

16. In a machine of the class described, the combination of a plurality of buffing wheels, a supporting frame, a holder journaled on said frame for supporting objects to be buffed, means for bodily moving said frame to carry an object from one wheel to the other, means for rotating said holder at one speed when the object is in association with one wheel, and means for rotating the holder at a different speed and in reverse direction when the object is associated with another wheel.

17. In a machine of the class described, the combination of two buffing wheels, a supporting frame between the wheels, a holder journaled on said frame for supporting objects to be buffed, means for rotating said holder, means for bodily moving said frame to carry an object into engagement first with one wheel and then with the other, and means for automatically changing the direction of rotation of said holder during transit of the object from one wheel to the other.

18. In a machine of the class described, the combination of two buffing wheels, a supporting frame between the wheels, a holder journaled on said frame for supporting objects to be buffed, means for rotating said holder, means for bodily moving said frame to carry the object into engagement first with one wheel and then with the other, and means for automatically changing the direction of rotation of the holder and the rate of rotation thereof during transit of the object from one wheel to the other.

19. In a machine of the class described, the combination of two buffing wheels, a supporting frame between the wheels, a holder journaled on said frame for supporting objects to be buffed, means for causing combined bodily movement and axial rotation of said frame to carry an object from one wheel to the other and to change its position with reference to the wheels, means for rotating said holder, and means for automatically increasing speed of rotation of the holder during transit of the object from one wheel to the other.

20. In a machine of the class described, the combination of two buffing wheels, a supporting frame between the wheels, a holder journaled on said frame for supporting objects to be buffed, means for causing combined bodily movement and axial rotation of said frame to carry the object from one wheel to the other and to change its position with reference to the wheels, means for rotating said holder, and means for automatically changing the direction of rotation of said holder during transit of the object from one wheel to the other.

21. In a machine of the class described, the combination of two buffing wheels, a supporting frame between the buffing wheels, a holder journaled on said frame for supporting objects to be buffed, means for bodily moving said frame to carry the object from one wheel to the other, slow speed driving means for rotating said holder, high speed driving means for rotating said holder, and cam mechanism for shifting the connection of said holder from one driving means to the other during transit of the object from one wheel to the other.

22. In a machine of the class described, the combination of a plurality of buffing wheels, means for carrying an object to be buffed from one buffing field to another, and means for automatically causing the object to rotate at different speeds in different buffing fields.

23. In a machine of the class described, the combination of buffing wheels, means for carrying an object to be buffed from one buffing field to another, driving mechanisms for rotating the object at different speeds, and means for automatically shifting from one driving mechanism to another as the object passes from one buffing field to another.

24. In a machine of the class described, the combination of a plurality of buffing wheels, means for carrying an object to be buffed from one buffing field to another, means for automatically causing the object to rotate at different speeds in different buffing fields, and means for automatically disconnecting the drive mechanisms from the object when the object has been treated in the last buffing field.

25. In a machine of the class described, the combination of a plurality of buffing wheels, means for carrying an object to be buffed from the field of one buffing wheel to that of another, driving mechanisms for rotating the object at different speeds, and cam mechanism for connecting the driving mechanisms successively with the object and for disconnecting the driving mechanisms from the object when the object has been treated in the field of the last buffing wheel.

In witness hereof, I hereunto subscribe my name this 30 day of July A. D. 1909.

JOHN F. GAIL.

Witnesses:
 GUS JACOB,
 C. E. HAWLEY.